United States Patent [19]
Lenz

[11] 3,811,372
[45] May 21, 1974

[54] STRAINING VAT AND PROCESS

[76] Inventor: Conrad Lenz, Annenhofstrabe 2, 805 Freising, Germany

[22] Filed: Dec. 8, 1972

[21] Appl. No.: 313,580

Related U.S. Application Data

[62] Division of Ser. No. 162,802, July 15, 1971, abandoned.

[52] U.S. Cl. .............................................. 99/277.1
[51] Int. Cl. .................................................. C12c 7/10
[58] Field of Search .......... 99/278, 277.1, 276, 277; 195/135

[56] References Cited
UNITED STATES PATENTS

| | | |
|---|---|---|
| 2,961,316 | 11/1960 | Cook .................................. 99/276 |
| 3,033,762 | 5/1962 | Schwaiger ......................... 195/135 |
| 3,452,669 | 7/1969 | Schaus ................................. 99/276 |
| 3,583,875 | 6/1971 | Wiesenauer ......................... 99/278 |

Primary Examiner—Robert W. Jenkins
Attorney, Agent, or Firm—Hans Berman; Kurt Kelman

[57] ABSTRACT

In a straining vat there is provided a perforated bottom and a wort outlet below said bottom. In a straining vat of this type the cooked mash is brought into the vat and is separated in the vat in its two constituents, i.e., draff and wort. The draff are solid constituents which remain on the perforated bottom, whereas the wort passes through the perforated bottom and is withdrawn through the outlet.

17 Claims, 4 Drawing Figures

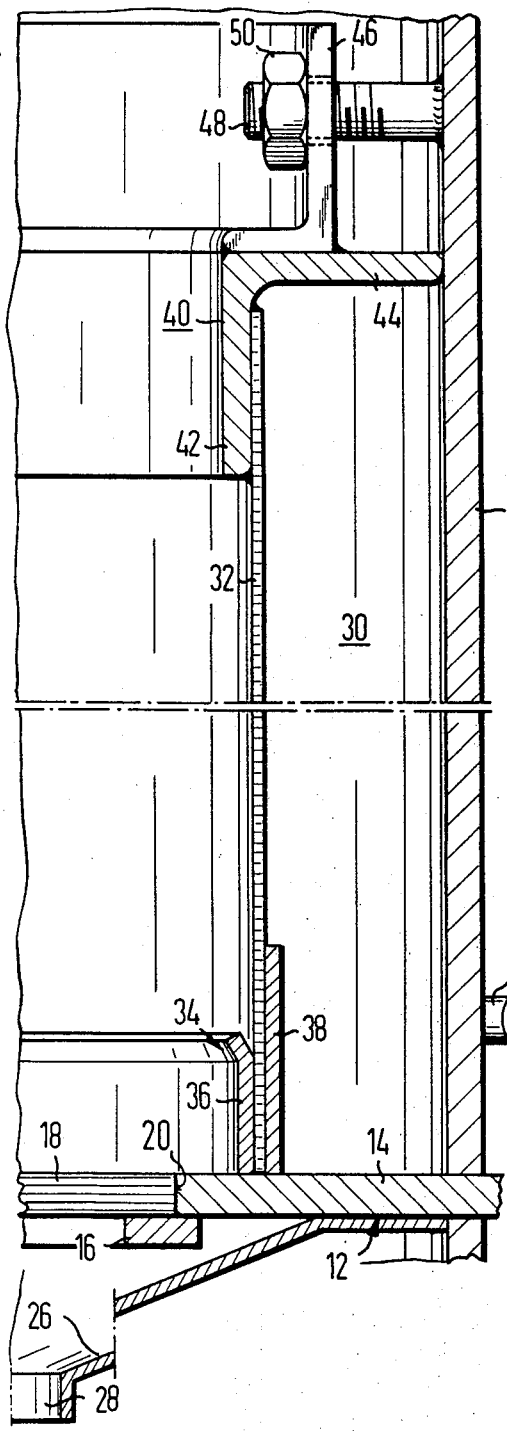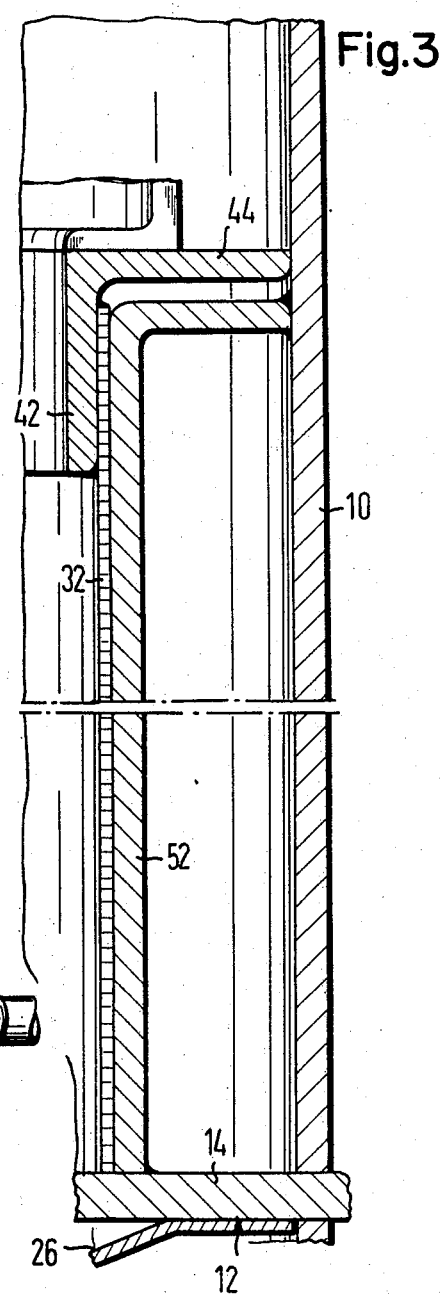

STRAINING VAT AND PROCESS

This application is a division of U.S. Pat. Ser. No. 162,802 filed July 15, 1971, now abandoned.

This invention relates to straining vats for recovering wort, comprising a perforated bottom, a first wort outlet below said perforated bottom and a duct adjacent the bottom and extending along the inner face of the straining vat, perforations being provided in said duct for receiving wort from said cooked mash contained within the vat, a second outlet being provided at said duct for withdrawing the wort entering into said duct through its perforations.

In a known straining vat of that type the perforated duct is formed as a torus which has an upwardly tapered cross-section.

Compared with the classic straining vats in which the wort is only withdrawn through the perforated bottom the known device including said perforated duct has brought certain advantages with respect to the time necessary for withdrawing the wort from the cooked mash. On the other side the known device including the perforated duct is not satisfactory with respect to the difficulties of mounting and cleaning.

It is the object of this invention to provide a straining vat of the type comprising a perforated bottom and a perforated duct adjacent the bottom and extending along the inner face of the side wall, in which the mounting of the duct is improved and in which the cleaning is facilitated.

With this object and others in view, as will hereinafter become apparent, the invention provides a perforated annular duct directly adjacent the inner surface of the straining vat, the radially inner boundary wall of the perforated annular duct being formed by a perforated wall which is parallel to the inner surface of the straining vat.

Other features and many of the attendant advantages of this invention will readily become apparent as the invention becomes better understood by reference to the following detailed description of a preferred embodiment when considered in connection with the accompanying drawing in which:

FIG. 2 is a section according to lines II—II of FIG. 1;

FIG. 3 is a section according to lines III—III of FIG. 1;

Figure 1:
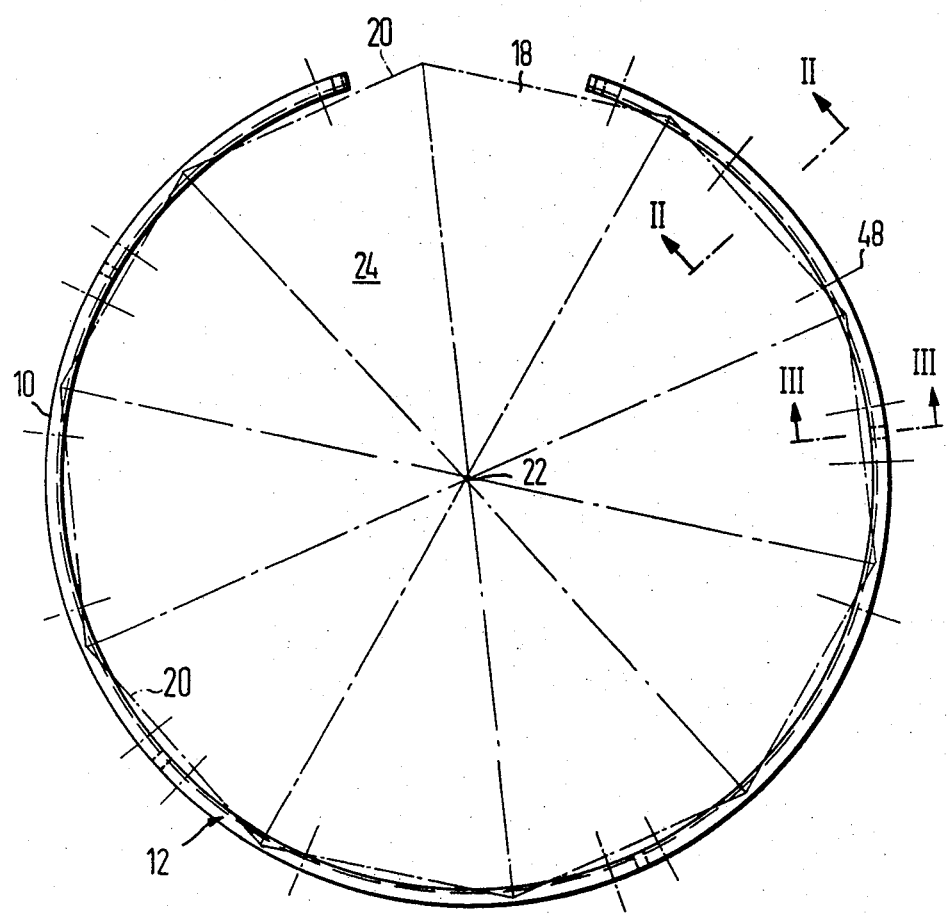
FIG. 1 is a plan view of a straining vat of this invention.

This side wall of the straining vat is marked in the drawings with 10, the vat bottom generally with 12. The vat bottom 12 shows an edge 14. A supporting bar 16 is mounted to the edge 14. Triangular bottom sections 18 defining with their bases 20 a polygonal circumferential face and extending with their tops 22 into the center of the straining vat are resting upon said supporting bar. The inner circumferential face of the edge 14 has also polygonal shape corresponding to the polygonal shape of the subsequent triangular bottom sections. The triangular bottom sections 18 form a perforated bottom 24. A discharge groove 26 comprising a first wort outlet 28 is situated next to the edge 14.

Above the edge 14 is formed a perforated annular duct 30. The perforated annular duct 30 is made of perforated cylinder sections 32 connected to each other in circumferential direction. The perforated wall sections 32 are inserted at their lower edges into connection gaps 34 defined by ribs 36, 38 opposite each other. The upper edges of the perforated wall sections 32 are welded to L-profile bars 40 abutting with one limb 42 against the perforated wall sections and bridging with the other limb 44 the distance between the perforated wall sections 32 and the inner surface of the vat. The L-profile bars 40 are bent corresponding to the bending of the perforated wall sections 32 and of the inner surface of the vat. Lashes 46 are fixed to the L-profile bars 40. By means of these lashes the L-profile bars 40 and with them the perforated wall sections 32 are suspended on pins 48 welded to the side wall 10 of the vat and bearing securing nuts 50.

As can be seen from FIG. 3 covering members 52 are arranged at the border lines of the subsequent perforated wall sections 32 to bridge the border lines.

The perforated annular duct 30 shows a wort discharge 54 which comprises a locking valve 56. The wort discharge 54 of the perforated annular duct and the wort discharge 28 of the perforated bottom are led together which is however not illustrated.

The height of the perforated duct is approximately 450 mms. The draff level in the vat amounts to 600 to 750 mms.

The straining is effected in such a manner that first is discharged simultaneously through the first wort outlet 28 and through the second wort outlet 54; thus all the foremost wort is discharged. 30 per cent of the following wort are discharged simultaneously through the first wort outlet 28 and through the second wort outlet 54. Then the locking valve 56 of the second wort outlet 54 is actuated so that the remaining wort is discharged only through the first wort outlet 28.

Figure 4:
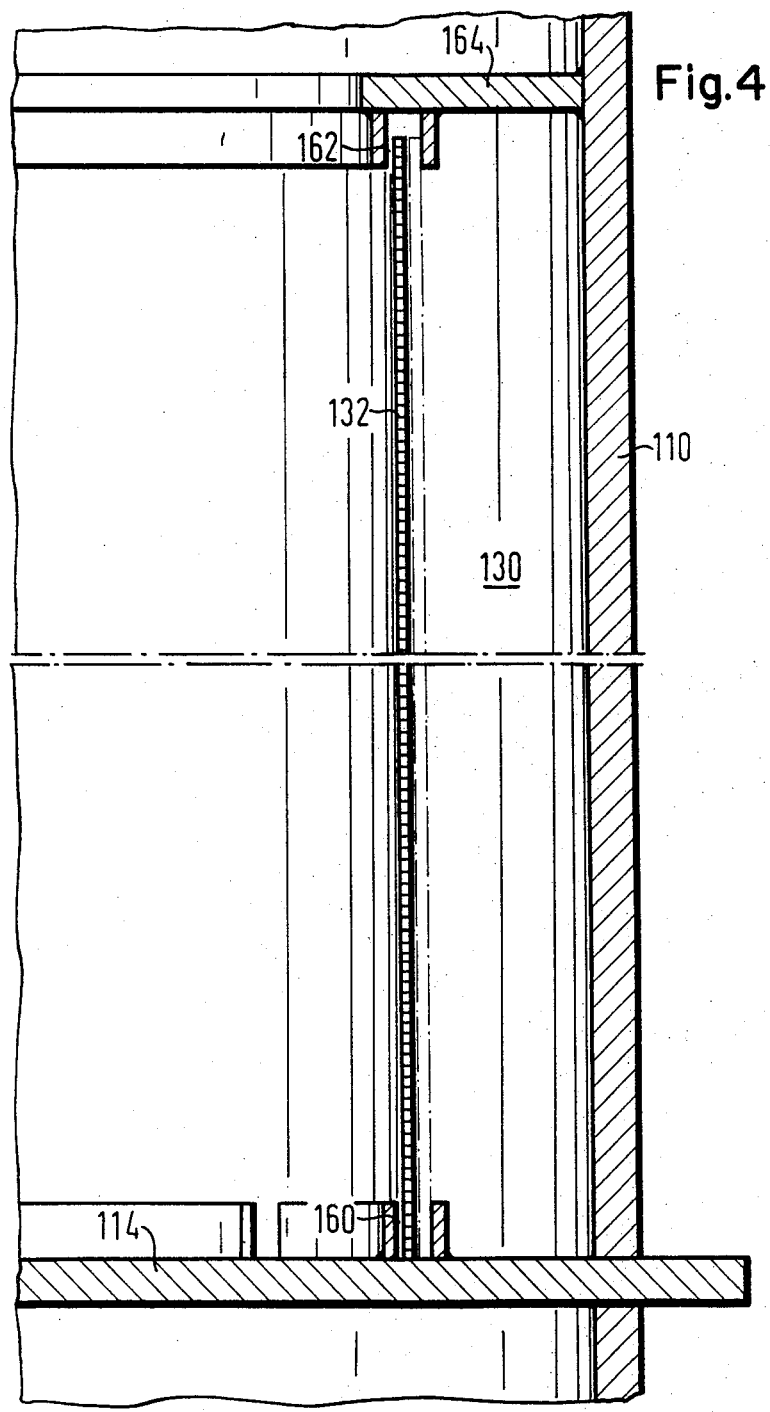
FIG. 4 is a section corresponding to that of FIG. 2 with another embodiment of this invention.

FIG. 4 shows an embodiment wherein the perforated wall sections 132 are mounted in another way. Insertion gaps 160 are at the bottom 114, corresponding insertion gaps 162 at the cover bar which is fixed to the side wall of the vat. The insertion gaps 160 and 162 are (not illustrated) provided at least at one position of their periphery with recesses so as to allow insertion of the perforated wall sections 132 tangentially through the recesses into the gaps 160/162. The width of the insertion gaps 160/162 is such to leave place for double the wall thickness of triangular bottom sections. The perforated wall sections 132 may therefore overlap each other. For cleaning the annular chamber 130 defined behind the perforated wall sections 132 it is further possible to move the perforated wall sections 132 according to the sliding door principle so as to get openings.

Another possibility of inserting the perforated wall sections 132 into the insertion gaps 160/162 is to be seen in the feature that, measured above the bottom 114, the height of the perforated wall sections 132 is larger than the distance from the lower edges of the insertion gaps 162 to the bottom 114, that on the other hand however the lower side of the cover bar 164 has a distance from the upper edge of the guiding gap 160 which is larger than the height of the perforated wall sections. The perforated wall sections 132 can be assembled by first inserting them into the insertion gap 162 and then lowering them into the insertion gap 160.

What is claimed is:

1. In a vat for straining beer wort, comprising a perforated bottom, a first wort outlet below said perforated bottom, a perforated annular duct extending next to the bottom along the inner surface of the straining vat, and a second wort outlet connected to said perforated annular duct, the improvement which consists in: said perforated annular duct being directly adjacent the side wall of the straining vat, the radially inner boundary wall of said perforated annular duct being formed by a perforated wall which is parallel to the inner surface of the straining vat.

2. In a straining vat as set forth in claim 1, said straining vat having cylindrical shape, said perforated wall being made by perforated cylinder sections.

3. In a straining vat as set forth in claim 2, the border lines between subsequent perforated cylinder sections being covered by covering members fixed to the vat, said covering members abutting against the inner side of said perforated wall sections.

4. In a straining vat as set forth in claim 2, the perforated cylinder sections (132) being inserted in insertion gaps of the bottom and of one cover bar which is fixed to the surface of the vat.

5. In a straining vat as set forth in claim 4, said insertion gaps being provided at least at one position of their circumferential face with slots through which the perforated wall sections are tangentially insertable into the gaps.

6. In a straining vat as set forth in claim 4, the height of the perforated wall sections being larger than the distance from the lower edge of the upper insertion gap to the bottom of the straining vat, but being smaller than the distance from the lower side of the cover bar to the upper edge of the lower insertion gap, and the perforated wall sections being insertable into the insertion gaps by first inserting them from below into the upper insertion gap and thereupon lowering them into the lower insertion gap.

7. In a straining vat as set forth in claim 1, said perforated annular duct being defined at its lower end by the bottom of the straining vat.

8. In a straining vat as set forth in claim 7, the bottom of said straining vat being unperforated in the region of the perforated annular duct.

9. In a straining vat as set forth in claim 1, said perforated annular duct being covered at its upper side by an unperforated cover bar.

10. In a straining vat as set forth in claim 9, said cover bar being formed as an L-profile bar having one limb adjacent the radially inner face of the perforated wall and the other limb bridging the radial distance between said perforated wall and the side wall of the vat.

11. In a straining vat as set forth in claim 9, said cover bar being fixed to the perforated wall, and fastening means for fastening the perforated wall being in engagement with the cover bar.

12. In a straining vat as set forth in claim 1, said perforated wall being detachable.

13. In a straining vat as set forth in claim 12, said perforated wall being inserted into an insertion gap in the bottom of the straining vat.

14. In a straining vat as set forth in claim 1, said perforated bottom having, as known per se, triangular bottom sections supported with their bases at the periphery of the straining vat and extending with their top ends into the center of the straining vat.

15. In a straining vat as set forth in claim 14, the upper sides of said triangular bottom sections having an upper face essentially flushing with the upper face of the vat bottom edge defining the bottom of said perforated annular duct, the inner periphery of said bottom edge having a polygonal form adapted to the polygonal shape defined by the subsequent triangular bottom sections, and the triangular bottom sections resting upon an annulus fixed to a bottom edge.

16. In a straining vat as set forth in claim 1, the second wort discharge being lockable by a locking valve, independently from the first wort discharge.

17. In a straining vat as set forth in claim 1, the height of the perforated wall corresponding to 30 to 70 per cent, preferably 40 to 60 per cent, of the draff level to be expected.

* * * * *

UNITED STATES PATENT OFFICE
CERTIFICATE OF CORRECTION

Patent No. 3,811,372　　　　　　　　　Dated May 21, 1974

Inventor(s) CONRAD LENZ

It is certified that error appears in the above-identified patent and that said Letters Patent are hereby corrected as shown below:

In the heading, after line /62/ insert --

/30/ Foreign Application Priority Data

July 20, 1970　Germany ................ P 20 35 955.1

Signed and sealed this 24th day of September 1974.

(SEAL)
Attest:

McCOY M. GIBSON JR.　　　　　　　　C. MARSHALL DANN
Attesting Officer　　　　　　　　　Commissioner of Patents